United States Patent
Neidlinger et al.

(10) Patent No.: US 6,830,768 B2
(45) Date of Patent: Dec. 14, 2004

(54) SNACK PRODUCT

(75) Inventors: Sylke Neidlinger, Lausanne (CH); Paul Mikota, Grandvaux (CH); Agnes Houlmann, Yver-don-Les-Bains (CH)

(73) Assignee: Nestec S.A., Vevey (CH)

(*) Notice: Subject to any disclaimer, the term of this patent is extended or adjusted under 35 U.S.C. 154(b) by 475 days.

(21) Appl. No.: 09/961,196

(22) Filed: Sep. 21, 2001

(65) Prior Publication Data

US 2002/0054944 A1 May 9, 2002

Related U.S. Application Data

(63) Continuation of application No. PCT/EP00/01594, filed on Feb. 28, 2000.

(30) Foreign Application Priority Data

Mar. 24, 1999 (EP) .............................. 99200914

(51) Int. Cl.$^7$ .............................. A23P 1/14; A23P 1/12; A21D 8/00
(52) U.S. Cl. .................. 426/448; 426/94; 426/594; 426/560; 426/447; 426/448; 426/516
(58) Field of Search ................. 426/446, 447, 426/448, 516, 94, 594, 560

(56) References Cited

U.S. PATENT DOCUMENTS

| | | | | |
|---|---|---|---|---|
| 4,650,685 A | | 3/1987 | Persson et al. | 426/285 |
| 4,820,470 A | * | 4/1989 | Ferrero | 264/555 |
| 4,910,029 A | * | 3/1990 | Thulin et al. | 426/94 |
| 5,250,308 A | * | 10/1993 | Alexander et al. | 426/94 |
| 5,451,419 A | * | 9/1995 | Schwab et al. | 426/564 |
| 5,700,512 A | | 12/1997 | Desjardins et al. | 426/557 |
| 6,033,696 A | * | 3/2000 | Aebischer et al. | 426/94 |
| 6,468,579 B1 | * | 10/2002 | Roussel et al. | 426/656 |

FOREIGN PATENT DOCUMENTS

| | | |
|---|---|---|
| DE | 27 12 311 | 3/1977 |
| EP | 0 431 201 | 12/1989 |
| EP | 0 908 106 | 10/1997 |
| EP | 1 002 463 | 10/1999 |
| WO | WO95/04475 | 7/1994 |

* cited by examiner

Primary Examiner—N. Bhat
(74) Attorney, Agent, or Firm—Winston & Strawn LLP

(57) ABSTRACT

A process of manufacturing a cooked-extruded-expanded dietetically valuable snack product mainly comprising an amylaceous material and milk solids, and which has a fine, porous, crunchy, smooth and melt-in-the-mouth texture while being rich in protein and calcium

17 Claims, No Drawings

SNACK PRODUCT

CROSS REFERENCE

This application is a continuation of the U.S. national stage designation of International application PCT/EP00/01594 filed Feb. 28, 2000, the content of which is expressly incorporated herein by reference thereto.

BACKGROUND OF THE INVENTION

A number of expanded snack products are known in the art. The following are examples:

U.S. Pat. No. 4,650,685 to Persson et al. discloses a biscuit comprising agglomerated granules of a cooked-extruded base coated with a binder, the base comprising from 40 to 80 parts by weight of cereal flour, up to 20 parts sucrose and from 0.5 to 3 parts of oil or fat, and the binder comprising from 8 to 30 parts by weight of sucrose and/or mixtures of glucose and its polymers.

JP 01174322 (QP Corp.) discloses a drop or cookie for babies and infants obtained by baking a dough consisting of starch, saccharides and milk, containing a powder of fruit juice but no egg material.

U.S. Pat. No. 4,044,159 issued to Lutz, discloses a ready-to-eat expanded cereal product in the form of thin flakes, suitable for the feeding of junior age infants, obtained by cooking-extruding-expanding a moist blend comprising cereal grain, slicing the expanded rope of cooked-extruded blend into flakes and drying the flakes.

WO89/04121 (HEINZ SCHAAF OHG) discloses a process for manufacturing cereals by cooking-extruding a mixture of cereal material, vegetable and/or fruits with a partial amount of sugar and milk, cutting the expanded rope of cooked-extruded mixture into pieces having a large surface, spraying an aqueous suspension of sugar and milk onto the just cut, hot and moist pieces, coating the moistened pieces with a remaining part of components in powder form and drying the coated pieces.

WO93/17592 (SCHAAF TECHNOLOGIES GMBH) discloses a process and an apparatus for cooking-extruding-expanding vegetable and/or fruit containing cereals, in which expansion is carried out in a large expansion zone provided for after an extrusion zone and before a cutting zone.

EP-A-0431203 (SOCIETE DES PRODUITS NESTLE S.A.) discloses extrusion-cooked cereal flakes having a layered, crumbly texture and a density of 75 to 200 g/l.

DE 2712311 A (VAASAN HOERMYLLY OY) discloses a porous flat bread which may have a protein content between 25–30% which results from the addition of e.g., concentrated milk albumin.

Despite these products, there still remains a need for improvements in this area, and the present invention satisfies this need.

SUMMARY OF THE INVENTION

The present invention provides a cooked-extruded-expanded snack product mainly comprising amylaceous material and milk solids, and has a fine, porous, crunchy, smooth and melt-in-the-mouth texture, while being dietetically valuable. The present invention also provides a process for manufacturing such a snack product.

The present invention also provides a cooked-extruded-expanded snack product which may be coated with a sugar based coating, and one that further comprises milk solids.

The present invention also provides a cooked-extruded-expanded snack product, which may be filled with fruit, vegetable or cream based filling.

The a cooked-extruded-expanded snack product has a porous texture and a specific weight of from 60 to 180 g/l. The product preferably comprises, in percent by weight, from 5.5 to 27.5% of non-fat milk solids, from 2.5 to 12.5% of milk fat and/or vegetable fat, from 50 to 80% of amylaceous material, up to 15% of sugar and from 1 to 8%, residual water, and preferably 1.0 to 3.0% residual water.

The process for manufacturing the snack product consists of cooking-extruding-expanding at 120° to 170° C. under 40 to 160 bar for 5 to 50 s a mixture comprising, in parts by weight, from 5.5 to 27.5 parts of non-fat milk solids, from 2.5 to 12.5% of milk fat and/or vegetable fat, from 50 to 80% of amylaceous material, up to 12 parts sugar and added water up to a water content of from 11 to 19% by weight of the mixture, thus obtaining a rope of a thermoplastic mass having a porous texture, cutting the rope into pieces and optionally drying them down to a residual water content of from 1 to 3%.

"Being dietetically valuable" may be understood as designating a snack product based on amylaceous material especially comprising, in percent by weight, from 5.5 to 27.5% of non-fat milk solids, and from 2.5 to 12.5% of milk fat and/or vegetable fat, which means a snack product based on amylaceous material which is rich in protein and calcium.

As a whole, beside a few percent of each of residual water, ash and dietary fiber, the snack product may generally comprise, in percent by weight, from about 6 to 18% of protein, from about 60 to 80% of available carbohydrate and from about 2.5 to 15% of fat.

It has surprisingly been found that with a high content of milk solids, for example, a content more than about 16%, of whole milk solids, which is more than about 11% non-fat milk solids and more than about 5% milk fat, it is still possible to obtain an expanded snack product that has a fine, porous, crunchy, smooth, and melt-in-the-mouth texture, which is not hard.

The snack product comprises from 5.5 to 27.5%, and preferably more than 11 to 22%, and more preferably more than 11 to 27.5% of non-fat milk solids, from 2.5 to 12.5%, and preferably more than 5 to 10% and more preferably more than 5 to 12.5% of milk fat and/or vegetable fat, from 50 to 80% of amylaceous material, up to 15% of sugar, and from 1.0 to 8.0%, and preferably from 1 to 3% of residual water.

In addition to the calcium already present in the snack product, the snack product may further comprise up to 3% of additional calcium, preferably in the form of calcium carbonate. The snack product may also farther comprise added vitamins, oligoelements, sodium chloride and/or a source of dietary fibers.

The non-fat milk solids in the cooked-extruded bases may be powdered skimmed milk. The milk fat and/or vegetable fat in the cooked-extruded bases may be butter oil, vegetable oil or fat which may act as lubricating agent in the cooking-extruding process. The milk solids in the binder may be whole milk powder.

The amylaceous material may be cereal flour, a starch and/or maltodextrin, for example. The cereal flour may be wheat, barley, oat, rice and/or corn. The starch may be a native starch from wheat, barley, rice, tapioca, potato and/or corn, especially waxy corn. The sugar may be sucrose, dextrose and/or fructose. The source of dietary fiber may be a cereal bran.

The snack product may be eaten as such, or after having been coated with a sugar based coating, or after having been filled with a fruit, vegetable or cream based filling.

Depending on the way the snack product is intended to be eaten, it may have different shapes such as the shape of simple granules intended to be coated with a sugar base coating and agglomerated into a biscuit, a shape of fruits, vegetable or familiar items such as star, flower, heart, square or loop, intended to be coated with a sugar base coating and to be eaten with the fingers especially by toddlers but also by infants or adults, or a hollow shape of tube or cup intended to be filled with a fruit, vegetable or cream based filling.

An adequate coating may have a milk solids content which is lower, similar to or even more than the milk solids content of the snack product itself.

An adequate filling may have an Aw of from between 0.2 to 0.5.

DETAILED DESCRIPTION OF THE PREFERRED EMBODIMENTS

For carrying out the present process for manufacturing a snack product, a mixture is prepared which comprises, in parts by weight, from 5.5 to 27.5 parts, preferably from more than 11 to 22 parts and more preferably from more than 11 to 27.5 parts of non-fat milk solids, from 2.5 to 12.5 parts, preferably from more than 5 to 10 parts and more preferably from more than 5 to 12.5 parts of milk fat and/or vegetable fat, from 50 to 80 parts of amylaceous material, up to 12 parts of sugar, and added water up to a water content of from about 11 to 19%, such a water content being adequate for obtaining a correct expansion after cooking-extruding the mixture.

The mixture may further comprise up to 3 parts of additional calcium, preferably in the form of calcium carbonate, in addition to the calcium already present in the non-fat milk solids. The mixture may further comprise added vitamins, oligoelements, and sodium chloride.

The mixture may be prepared by first mixing together powdery components to obtain a dry mix and then mixing together the dry mix and liquid or fluid components. This mixing step may be carried out in a first mixing section of a traditional food extruder, especially a twin screw extruder.

Cooking the mixture may then be carried out in subsequent sections of the extruder where the mixture is heated, compressed and sheared so that it forms a cooked thermoplastic mass.

The thermoplastic mass may be extruded by having it pushed by the extruder screw or twin screw through the openings of a die provided for at an end of the extruder.

The die may have one or more circular openings having of from 2 to 5 mm in diameter. The die openings may also have different, fancy shapes such as star, ring, half moon, flower, heart, square, loop or banana having a size, especially a length or a diameter of from about 5 to about 25 mm.

The thermoplastic mass may be expanded by extruding it through the die into an open space at ambient temperature and at atmospheric pressure.

Water is lost in the form of steam escaping the thermoplastic mass during expansion so that the rope obtained has a porous texture and may have a water content of from 4 to 8%.

In a preferred embodiment of the present process, compressed nitrogen is injected into the plasticized mass just before extruding it. Nitrogen injection may be carried out under a pressure of from about 35 to 160 bar, at a rate of from 0.1 to 0.6 g nitrogen per kg of mass.

Most surprisingly, the cooked-extruded thermoplastic mass does not expand to a greater degree under the effect of nitrogen injection but on the contrary to a lesser degree. This is because the injected nitrogen not only increases the number of bubbles within the expanded rope of cooked-extruded thermoplastic mass but also cools down the mass before it is extruded. A fine porous texture may be obtained in this way which stands in contrast with a rather coarse porous texture which may be obtained without nitrogen injection.

The step of cutting into pieces the obtained rope of expanded thermoplastic mass may be carried out by a two or more blade cutter rotating adjacent to the die openings.

The optional step of drying the pieces, preferably down to a residual water content of from about 1 to 3% by weight, may be carried out, for example, on a belt drier with hot air.

In order to optionally coat the snack product with a sugar based coating, a slurry may be sprayed onto the snack product. The slurry may comprise, in parts by weight, from 30 to 60 parts of sugar, up to 32 parts of whole milk powder, up to 60 parts of fruit pulp or concentrate, up to 10 parts of cocoa powder and added water up to a water content of from 20 to 30%.

In the slurry, the sugar may be sucrose, fructose, dextrose and/or raw cane sugar. The optional step of coating the snack product by spraying thereon a slurry having the composition disclosed above may be carried out in a cylindrical tumbler rotating around its generally horizontal axis and being provided inside with spraying nozzles. Preferably located in an upper part of the cylindrical internal space defined by the tumbler wall, such nozzles may spray the slurry downwards onto the tumbled snack product.

Then, the just coated snack product may be dried again to a residual water content of from 1 to 3% by weight on a belt drier with hot air.

The possible filling of a snack product having a hollow shape of tube or cup may be carried out by co-extrusion, for example. The snack product obtained, possibly coated or filled may be conditioned in a packing providing for its protection against humidity, such as a packing made of a film with aluminum foil.

EXAMPLES

The following examples are given as illustration of embodiments of the snack product and embodiment of the process for its manufacture according to the present invention. The parts and percentages are given in parts by weight.

Example 1

For manufacturing a snack product having a heart shape, which was to be eaten with the fingers by toddlers, a mixture was prepared that had the following compositions (in parts, except added water):

| | |
|---|---|
| Wheat flour | 72 |
| Waxy corn starch | 6 |
| Whole milk powder (26% fat) | 20 |
| Butter oil | 2 |
| Added water, up to a water content of | 12% |

For preparing the mixture, the powders were first mixed together to obtain a dry mix. The dry mix, oil and added water were then mixed together in the extruder. The mixture obtained in this way was cooked-extruded-expanded with the aid of a BC-72 type CLEXTRAL twin screw extruder having a screw diameter of 88 mm and a total processing length of 900 mm.

Cooking-extrusion was carried out at 135° C. under 140 bar for 30 s, the two intermeshing screws rotating at 460 rpm. The cooked thermoplastic mass obtained in this way was extruded through a die having three heart shaped outlet openings or orifices about 7 mm in height and 7 mm in width.

The thermoplastic mass was extruded into ambient air and immediately cut with a two blade cutter rotating adjacent to the opening at 2300 rpm.

The heart shaped snack product obtained in this way expanded after cutting so that they were about 20 mm in length and about 20 mm in width. It had a water content of 7.6%. It had a specific weight of 97 g/l.

The heart shaped snack product was then dried with hot air on a belt dryer to a residual water content of 2.5%.

Meanwhile a slurry had been prepared which had the following composition (%):

| | |
|---|---|
| Sucrose | 20 |
| Whole milk powder (26% fat) | 12 |
| Banana juice conc. | 28 |
| Banana puree | 12 |
| Water | 28 |

For preparing the slurry, the components were mixed together in a double walled tank while being heated to about 50° C.

In a tumbler 80 cm in diameter and 150 cm in length, the slurry was sprayed while still hot onto the tumbling snack product by means of 5 spray nozzles, at a rate of 65 kg of slurry for 150 kg of snack product per hour.

The freshly coated snack product was then dried with hot air on a belt dryer to a residual water content of 1.5%.

The coated snack product had a heart shape and the taste of banana. It had a specific weight of 140 g/l, a fine, porous, crunchy, smooth and melt-in-the-mouth texture and it could be eaten with the fingers of toddlers. As a whole it had the following composition (%):

| | |
|---|---|
| Protein | 13.0 |
| Available carbohydrate | 73.9 |
| Fat | 7.7 |
| Dietary fibers | 1.8 |
| Ash | 2.5 |
| Water | 1.1 |

Example 2

For manufacturing a snack product having a tubular shape, a mixture was prepared which had the following composition, (in parts, except added water):

| | |
|---|---|
| Corn semolina | 49 |
| Wheat flour | 15 |
| Waxy corn starch | 10 |
| Crystal sugar | 12 |
| Skimmed milk powder | 8 |

-continued

| | |
|---|---|
| Butter oil | 6 |
| Added water, up to a water content of | 12% |

For preparing the mixture, the powders were first mixed together to obtain a dry mix. The dry mix, oil and added water were then mixed together in the extruder. The mixture obtained in this way was cooked-extruded with the aid of a BC-45H type CLEXTRAL twin screw extruder having a screw diameter of 55 mm and a total processing length of 1200 mm.

Cooking-extrusion was carried out at 153° C. under 50 bar for 30 s, the two intermeshing screws rotating at 350 rpm.

The extruder was equipped with a die having a circular opening 4.5 mm in diameter and a concentric annular opening 8 mm in diameter and 1 mm in thickness.

Nitrogen was injected into the thermoplastic mass at a screw processing length of 1030 mm, under 37 bar and at a rate of 80 g/h.

The cooked thermoplastic mass was extruded into ambient air through the annular opening while a cream based filling having an Aw of 0.4 was coextruded through the circular opening.

The tubular rope of cooked-extruded-expanded thermoplastic mass filled with a cylindrical rope of coextruded cream filling was cooled down rapidly in order to solidify. It was cut into pieces or sticks about 100 mm in length.

The tubular shaped snack product itself, without filling, was about 15 mm in diameter and had a wall thickness of about 3–5 mm. It had specific weight of 110 g/l, a residual water content of 7.5% and a fine, porous, crunchy, smooth and melt in the mouth texture.

Example 3

For manufacturing a snack product having a heart shape, which was to be eaten with the fingers of toddlers, a mixture was prepared which had the following composition (in parts, except added water):

| | |
|---|---|
| Wheat flour | 15.7 |
| Rice flour | 16.4 |
| Corn semolina | 16.0 |
| Corn starch | 16.0 |
| Whole milk powder (26% fat) | 33.2 |
| Calcium carbonate | 0.6 |
| Sodium chloride | 0.1 |
| Added water, up to a water content of | 12% |

For preparing the mixture, the powders were first mixed together to obtain a dry mix. The dry mix, oil, and added water were then mixed together in the extruder. The mixture obtained in this way was cooked-extruded-expanded with the obtained aid of a BC-45 type CLEXTRAL twin screw extruder having a screw diameter of 55 mm and a total processing length of 1200 mm.

Cooking-extrusion was carried out at 153° C. under 55 bar for 30 s, the two intermeshing screws rotating at 330 rpm. The cooked thermoplastic mass obtained in this way was extruded through a die having a heart shaped outlet opening or orifice about 7 mm in height and 7 mm in width.

The thermoplastic mass thus obtained was extruded into ambient air and immediately cut with a two blade cutter rotating adjacent to the opening at 2800 rpm.

The heart shaped snack product obtained in this way expanded after cutting so that it was about 15 mm in length and 15 mm in width. It had a water content of 6.5%.

The heart shaped snack product was dried with hot air on a belt dryer to a residual water content of 2.0%.

The heart shaped snack product had a specific weight of 130 g/l, a fine, porous, crunchy, smooth and melt-in-the-mouth texture and it could be eaten with the fingers by toddlers.

As a whole it had the following composition (%):

| | |
|---|---|
| Protein | 13.3 |
| Carbohydrate | 71.2 |
| Fat | 9.5 |
| Dietary fiber | 1.0 |
| Ash | 3.0 |
| Water | 2.0 |

What is claimed is:

1. A process for manufacturing a snack product comprising:
   preparing a mixture comprising, in parts by weight, from 5.5 to 27.5 parts of non-fat milk solids, about 2.5 to 12.5 parts of milk fat or vegetable fat or combination thereof, about 50 to 80 parts of amylaceous material, up to 12 parts of sugar, and added water up to a water content of from 11 to 19% by weight of the mixture;
   cooking the mixture at 120 to 170° C. under 40 to 160 bar for 5 to 50s;
   to obtain a thermoplastic mass having a porous texture;
   injecting compressed nitrogen into the thermoplastic mass to decrease the size of the pores and cooling the mass before extrusion; and
   extruding the thermoplastic mass to obtain a snack product.

2. The process of claim 1, which further comprises cutting the extruded thermoplastic mass to provide pieces of the snack product.

3. The process of claim 1, in which the mixture comprises from about 11 to 27.5 parts of non-fat milk solids and about 5 to 12.5 parts of milk fat or vegetable fat or a combination thereof.

4. The process of claim 1 wherein the mixing step is carried out in a first mixing section of a traditional food extruder and cooking the mixture is carried out in a subsequent section of the extruder.

5. The process of claim 1 wherein the mixture is heated, compressed and sheared so that it forms a cooked thermoplastic mass.

6. The process of claim 1, in which the mixture further comprises adding to the mixture calcium to provide a total amount of calcium of up to 3 parts, additional vitamins, oligoelements, sodium chloride, or combination thereof.

7. The process of claim 1 wherein the thermoplastic mass is extruded by having it pushed by the extruder screw or twin screw through the openings of a die provided for at an end of the extruder.

8. The process of claim 7, wherein the die openings have different shapes including a star, ring, half moon, flower, heart, square, loop or banana.

9. The process of claim 1 where rite thermoplastic mass is expanded by extruding it through a die into an open space at ambient temperature and atmospheric pressure.

10. The process of claim 1, further comprising drying the pieces down to a residual water content of about 1 to 3%.

11. The process of claim 1 wherein the thermoplastic mass is cut into pieces by a two or more blade cutter rotating adjacent to the extrusion die openings.

12. The process of claim 1, wherein the nitrogen injection is carried out under a pressure of about 35 to 160 bar and a rate of about 0.1 to 0.6 nitrogen per kilogram of mass.

13. A The process of claim 1 further comprising spraying the snack product with a slurry having a composition that comprises in parts by weight, about 30 to 60 parts of sugar, up to 32 parts of whole milk powder, up to 60 parts of fruit pulp or concentration, up to 10 parts of cocoa powder and added water up to a water content of about 20 to 30%.

14. A snack produce having a fine porous texture prepared by the process of claim 1.

15. The snack product of claim 14 having a filled center which is carried out by coextrusion.

16. The snack product of claim 14 having a residual water content of about 1 to 3% and being in the shape of a star, ring, half moon, flower, heart, square, loop or banana.

17. The snack product of claim 14 having a filled center.

* * * * *

UNITED STATES PATENT AND TRADEMARK OFFICE
CERTIFICATE OF CORRECTION

PATENT NO. : 6,830,768 B2
DATED : December 14, 2004
INVENTOR(S) : Neidlinger et al.

It is certified that error appears in the above-identified patent and that said Letters Patent is hereby corrected as shown below:

Column 8,
Line 9, after "oligoelements, sodium chloride, or", delete "combination" and insert -- combinations --.
Line 18, after "The process of claim 1 where", delete "rite" and insert -- the --.
Line 29, after "13.", delete "A".
Line 33, after "pulp or", delete "concentration" and insert --concentrate --.
Line 35, after "A snack", delete "produce" and insert -- product --.

Signed and Sealed this

Twenty-second Day of March, 2005

JON W. DUDAS
*Director of the United States Patent and Trademark Office*